(12) United States Patent
Singh et al.

(10) Patent No.: US 11,386,114 B2
(45) Date of Patent: Jul. 12, 2022

(54) STRUCTURE-BASED TRANSFORMERS WITH LOCALIZATION AND ENCODING FOR CHART QUESTION ANSWERING

(71) Applicant: Adobe Inc., San Jose, CA (US)

(72) Inventors: Hrituraj Singh, Uttar Pradesh (IN); Sumit Shekhar, Karnataka (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/076,484

(22) Filed: Oct. 21, 2020

(65) Prior Publication Data
US 2022/0121679 A1    Apr. 21, 2022

(51) Int. Cl.
| | | |
|---|---|---|
| *G06F 16/26* | (2019.01) | |
| *G06F 40/284* | (2020.01) | |
| *G06F 16/248* | (2019.01) | |
| *G06F 16/2455* | (2019.01) | |
| *G06F 16/242* | (2019.01) | |
| *G06K 9/00* | (2006.01) | |
| *G06V 30/422* | (2022.01) | |

(52) U.S. Cl.
CPC .......... *G06F 16/26* (2019.01); *G06F 16/243* (2019.01); *G06F 16/248* (2019.01); *G06F 16/2455* (2019.01); *G06F 40/284* (2020.01); *G06V 30/422* (2022.01)

(58) Field of Classification Search
CPC .... G06F 16/26; G06F 16/243; G06F 16/2455; G06F 16/248; G06F 40/284; G06K 9/00476
USPC ...................................................... 707/722
See application file for complete search history.

(56) References Cited

U.S. PATENT DOCUMENTS

| 8,712,834 B2* | 4/2014 | Lim ................... G06Q 30/0207 |
| | | 705/14.49 |
| 10,545,982 B1* | 1/2020 | Kramer ................... G06F 16/27 |
| 2008/0250012 A1* | 10/2008 | Hinckley .............. G06F 16/951 |
| 2018/0160180 A1* | 6/2018 | Kedenburg, III .. H04N 21/4758 |

(Continued)

OTHER PUBLICATIONS

Bahdanau, D. et al., Neural Machine Translation by Jointly Learning to Align and Translate, Sep. 2014, arXiv preprint arXiv:1409.0473, 16 pages.

(Continued)

*Primary Examiner* — Dung K Chau
(74) *Attorney, Agent, or Firm* — NDWE LLP

(57) ABSTRACT

Embodiments are disclosed for determining an answer to a query associated with a graphical representation of data. In particular, in one or more embodiments, the disclosed systems and methods comprise obtaining a visual embedding for a graphical representation of data, the visual embedding representing a plurality of graphical elements. The one or more embodiment further include obtaining a query embedding for a query associated with the graphical representation of data, the query embedding representing a plurality of textual elements of the query with at least one textual element substituted with an identifier for at least one graphical element of the set of graphical elements. The one or more embodiment further include generating a chart sequence from the visual embedding and a query sequence from the query embedding, generating an output sequence based on the graph and the query sequences, and determining an answer to the query from the output sequence.

20 Claims, 12 Drawing Sheets

(56) References Cited

U.S. PATENT DOCUMENTS

| | | | | |
|---|---|---|---|---|
| 2018/0336405 | A1* | 11/2018 | Messina | G06K 9/4628 |
| 2019/0099653 | A1* | 4/2019 | Wanke | A63B 24/0062 |
| 2019/0272296 | A1* | 9/2019 | Prakash | G06F 16/90335 |
| 2020/0372076 | A1* | 11/2020 | Li | G06F 16/9035 |
| 2020/0401593 | A1* | 12/2020 | Panuganty | G06F 9/505 |
| 2021/0019309 | A1* | 1/2021 | Yadav | G06F 16/245 |
| 2021/0081503 | A1* | 3/2021 | Tran | G06F 16/3329 |

OTHER PUBLICATIONS

Chaudhry, R. et al., LEAF-QA: Locate, Encode & Attend for Figure Question Answering, Mar. 2020, IEEE Winter Conference on Applications of Computer Vision (WACV), pp. 3512-3521.

He, K. et al., Mask R-CNN, Proceedings of the IEEE International Conference on Computer Vision (ICCV), Oct. 2017, pp. 2961-2969.

Kafle, K. et al., Answering Questions about Data Visualizations using Efficient Bimodal Fusion, IEEE Winter Conference on Applications of Computer Vision, 2020, arXiv:1908.01801v2 [cs.CV], 13 pages.

Kafle, K. et al., DVQA: Understanding Data Visualizations via Question Answering, Jan. 24, 2018, Proceedings of the IEEE Conference on Computer Vision and Pattern Recognition,, pp. 5648-5656.

Kahou, S.E. et al., FigureQA: An Annotated Figure Dataset for Visual Reasoning, Feb. 22, 2018, Workshop track—ICLR 2018, arXiv:1710.07300v2, 20 pages.

Siegel, N. et al., FigureSeer: Parsing Result-Figures in Research Papers, European Conference on Computer Vision, 2016, 16 pages.

* cited by examiner

STRUCTURE-BASED TRANSFORMERS WITH LOCALIZATION AND ENCODING FOR CHART QUESTION ANSWERING

BACKGROUND

In order to express data in documents in a concise manner, graphical representations of data are often used. Graphical representations of data, such as charts, plots, and graphs, can provide visual depictions of data sets using shapes and symbols that are more easily interpretable than the raw data or textual summaries of the data. However, while a graphical representation of data can quickly communicate information to people, it can pose problems to machines attempting to interpret the meaning of the graphical representations of data using existing solutions.

One existing solution is visual question answering (VQA), which relates to answering open-ended natural language questions about images. One drawback of existing VQA systems for natural images (e.g., scenes) is that they assume a fixed dictionary. However, assuming a fixed vocabulary makes it impossible to properly process many questions or to generate answers unique to a particular graphical representation of data, which can be labeled with proper nouns, abbreviations, or concatenations. Also, the reasoning is coarse-grained in natural images processed by VQA systems compared to that for graphical representations of data (e.g., visualization images). This can present problems for analyzing graphical representations of data, where details including bar length and color can significantly change the reasoning process and ultimately, the answer to the query.

These and other problems exist with regard to determining answers to queries associated with graphical representations of data in electronic systems.

SUMMARY

Introduced here are techniques/technologies that use machine learning techniques to provide an answer to a natural language query regarding a chart or other graphical representation of data using a Structure-based Transformers with Localization and Encoding for Chart Question Answering Chart Question Answering (CQA or STL-CQA) system. CQA systems handle an infinite question/answer vocabulary due to chart specific words, as well as uses multi-modal fine-grained reasoning through understanding of natural language questions as well as the visualizations in a graphical representation of data when the graphical representation of data can be visualized using different types of charts (e.g., bar chart, pie charts, line plots, etc.), different fonts, different colors, etc. Further, unlike natural text or images, the understanding of a graphical representation of data involves localization and establishing relationships among the different elements in the graphical representation of data.

In particular, in one or more embodiments, the disclosed systems and methods may include encoding a chart into a visual embedding and a query associated with the chart into a query embedding. The visual embedding may include information for the graphical elements of the chart (e.g., axes labels, legend, bar/pie pieces, etc.), including position information and a feature map. The query embedding may include an identifier for each element (e.g., word) of the query, where the identifier is assigned based on the element's position in the query, and where one or more elements of the query may be substituted with an identifier for graphical elements of the chart. The visual embedding and query embedding are converted into chart sequences and query sequences, respectively, and then passed through a series of transformers which encode the meaning of the query and the relationships of the elements of the chart to determine an answer to the query.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a chart question answering (CQA) system that receives a graphical representation of data (e.g., a chart) and natural language queries about the chart and uses machine learning to determine a best answer to the query. While images can be readily interpreted, charts pose unique challenges for systems attempting to ascertain their meaning. For example, shapes and colors of chart elements can have one set of meanings for a first chart, while the same shapes and colors can have entirely different meanings for a second chart. Further, unlike VQA systems, the text vocabulary in a CQA system is infinite. Each chart and query can consist of words having meanings specific to that chart. For example, the word "USA" can be in the title in one chart, a legend label in another chart, an x-axis label in a yet another chart, or refer to a particular pie-shaped wedge in a pie chart. Similarly, a red bar in a first bar chart that has a first length will have a different meaning from a second red bar in a second bar chart that has a second length. In contrast, shapes, objects, and colors typically have similar meanings across different natural images (e.g., images of the natural world, as opposed to images that are man-made or constructed randomly by a computer). For example, a blue car in a first natural image has a similar meaning to a blue car in a second natural image. Because traditional techniques, such as VQA systems, do not take into account how the graphical elements of a chart relate to each other in the context of the chart, the structure of an individual chart is lost when analyzing the chart.

To address these issues, the CQA system encodes the chart into a visual embedding which represents, e.g., axes labels, legend, bar/pie pieces, etc. Through this process, the CQA system determines the structure of the chart through understanding how the graphical elements of the chart interact with each other in the context of the chart. The CQA system further encodes the query into a query embedding to determine a meaning of the query. The outputs of that process are then passed through an additional transformer to perform a reasoning to determine how the graphical elements of the chart are related with the textual elements of the query to determine a best answer to the query.

Figure 1:
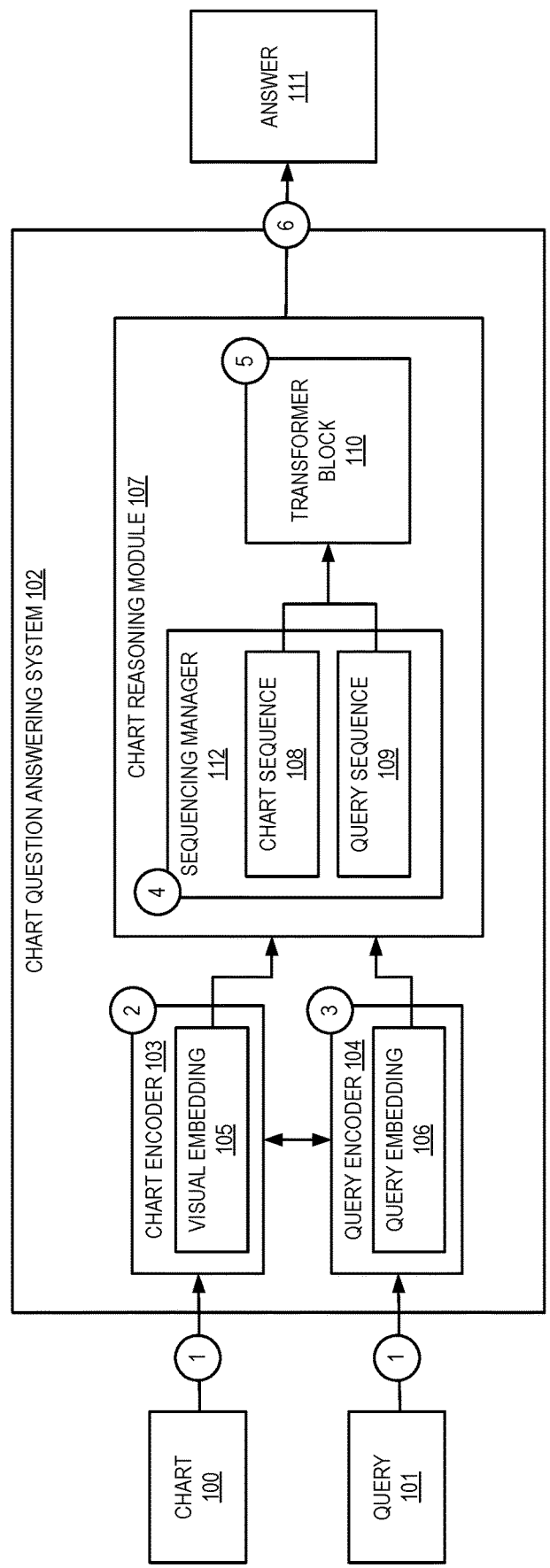
FIG. 1 illustrates a diagram of a process of generating an answer to a query regarding a graphical representation of data in accordance with one or more embodiments.

FIG. 1 illustrates a diagram of a process of generating an answer to a query regarding a graphical representation of data in accordance with one or more embodiments. As shown in FIG. 1, in one or more embodiments, a chart question answering system 102 receives a chart 100 and a query 101, as shown at numeral 1. For example, the chart question answering system 102 receives the chart 100 and the query 101 from a user via a computing device. In one example, a user may select a chart in a document processing application and be presented with an interface (e.g., a text box, etc.) through which the user may input a query regarding the chart. In another example, a user may submit a chart and one or more queries to a web service, or an application configured to receive charts and queries as inputs and provide answers to the queries as outputs. The chart 100 may be any type of graphical representation of data, including, but not limited to, a bar chart, a pie chart, a line chart, etc. The chart 100 may also include bar shaped objects for a bar chart, pie piece shaped objects for a pie chart, lines for a line chart, etc.

In one embodiment, the chart question answering system 102 includes a chart encoder 103 that receives the chart 100 and a query encoder 104 that receives the query 101. The chart encoder 103 generates a visual embedding 105 from the received chart 100, as shown at numeral 2. In one or more embodiments, the chart encoder 103 may be a neural network which receives the chart 100 as input and generates a visual embedding 105 of the chart 100 based on the graphical elements of the chart 100. The neural network may further perform localization on the chart by identifying the graphical elements of the chart and indicating the location of those graphical elements with bounding boxes. Graphical elements can include a chart title, an x-axis label, a y-axis label, a chart legend, and each bar, pie piece, or line in the chart 100.

As shown in FIG. 1, the query encoder 104 generates a query embedding 106 from the received query 101, as shown at numeral 3. Query 101 is a natural language question where the answer to query 101 is to be based on the data represented in chart 100. In one or more embodiments, the query embedding 106 generated by the query encoder 104 is a text string in which one or more words in the query 101 are substituted with graphical element identifiers based on data received from the chart encoder 103.

As shown in FIG. 1, the chart question answering system 102 can include a sequencing network 112 of a chart reasoning module 107 that generates chart sequences and query sequences from visual embeddings and query embeddings, respectively, as shown at numeral 4. For example, the sequencing network 112 receives the visual embedding 105 from the chart encoder 103 and generates a chart sequence 108. The chart sequence 108 can include a number of tokens, each chart element of the chart 100 associated with a token in the chart sequence 108. Further, each token of the chart sequence 108 can include position data (e.g., coordinates with the chart 100) for a bounding box encompassing a chart element and a portion of a feature map associated with the chart element.

Similarly, the sequencing network 112 receives the query embedding 106 from the query encoder 104 and generates a query sequence 109. The query sequence can include pairs of textual elements and tokens representing the position of that textual element in the query. For example, each textual element (e.g., word, punctuation, etc.) of the query 101 is associated with a token (e.g., "position 1, position 2, etc.) in the query sequence 109.

At numeral 5, the chart reasoning module 107 applies the sequences generated by the sequencing network 112 to a series of transformers in a transformer block 110, as shown at numeral 5. In one or more embodiments, the transformer block 110 includes at least, a first transformer for transforming the chart sequence 108, a second transformer for transforming the query sequence 109, and a third transformer for transforming the combined outputs of the first transformer and the second transformer. In one or more embodiments, the first transformer is configured to determine relationships between chart elements of the chart 100, the second transformer is configured to encode a meaning of the query 101, and the third transformer is configured to identify an answer 111 to the query 101 in the context of the chart 100. The dictionary of possible answers can include: an affirmative response ("yes"), a negative response ("no"), a numerical value (e.g., 1-10 or other numerical value), and chart identifiers. In some situations, the output from the transformer block 110 may include multiple answers. In one or more embodiments, the chart question answering system 102 selects only one of the multiple answers as answer 111.

At numeral 6, the chart question answering system 102 can return the answer 111 to the query 101. In one or more embodiment, the answer is sent to the user or computing device that initiated the query to the CQA. In one or more embodiments, the answer 111 is based on the predicted result from the transformation of the chart sequence 108 and query sequence 109.

Figure 2:
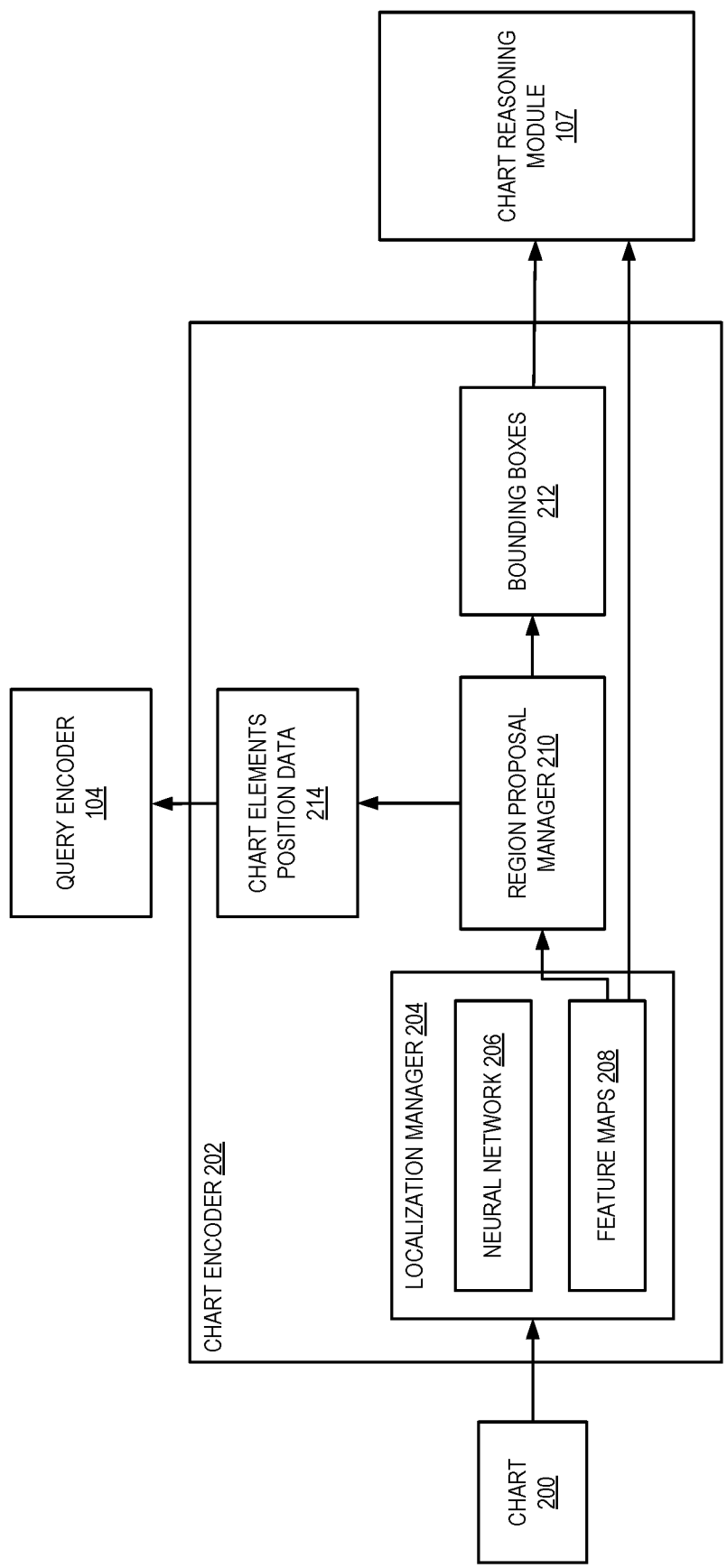
FIG. 2 illustrates a diagram of an example chart encoder in accordance with one or more embodiments.

FIG. 2 illustrates a diagram of an example chart encoder in accordance with one or more embodiments. In FIG. 2, the chart encoder 202 includes a localization system 204 and a region proposal manager 210. In other embodiments, the chart encoder 202 may include more or fewer modules than illustrated in FIG. 2.

As illustrated in FIG. 2, when the chart encoder 202 receives a chart 200 it is provided to the localization system 204. In one or more embodiments, the localization system 204 is configured to detect or localize the chart elements of the chart 200. For example, the localization system 204 can detect or localize the chart title, x-axis labels, y-axis labels, legend labels, and shapes and symbols (e.g., bars in a bar chart, pie pieces in a pie chart, line segments in a line chart, etc.).

In one or more embodiments, the localization system 204 includes a neural network 206. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one embodiment, the neural network 206 uses an object detection model that is trained to identify chart elements in the chart 200. In one example, the localization system 204 uses a Mask-R CNN with a Resnet backbone, a residual neural network, to detect or localize the various chart elements in the chart 200. Alternatively, other object detection models trained to identify and localize chart elements may also be used.

In one or more embodiments, the neural network 206 produces a feature map representative of the chart 200. The localization system 204 can then send the information indicating the localized chart elements and the feature map to the region proposal manager 210. In one or more embodiments, the region proposal manager is configured to determine bounding boxes for the various chart elements in the chart 200. In some embodiments, because reasoning in charts depends heavily on the correct detection of the geometry and type of each bounding box, the region proposal manager 210 applies non-maximal suppression to choose the most confident and distinct bounding boxes.

Figure 3:
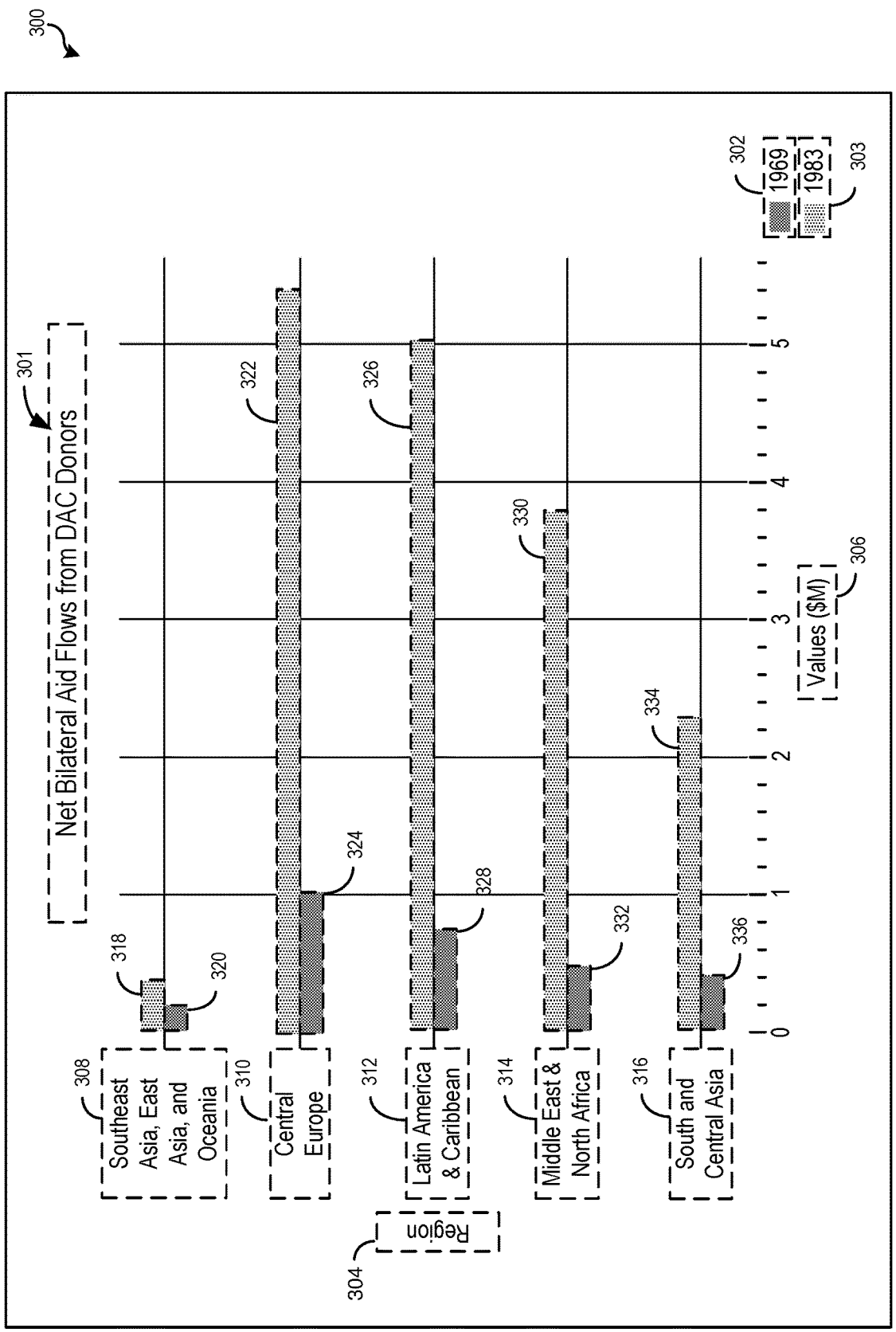
FIG. 3 illustrates an example graphical representation of data processed by a chart encoder in accordance with one or more embodiments.

FIG. 3 illustrates an example chart 300 processed by a chart encoder in accordance with one or more embodiments. As illustrated in FIG. 3, the chart 300 is titled, "Net Bilateral Aid Flows from DAC Donors," and visualizes datasets indicating the amount of bilateral aid to various regions in the years 1969 and 1983. After being processed by the localization system 204 and the region proposal manager 210, the chart 300 includes bounding boxes are the chart title (e.g., bounding box 301), a first legend label (bounding box 302), a second legend label (bounding box 303, the y-axis label (e.g., bounding box 304), the x-axis label (e.g., bounding box 306), y-axis labels (e.g., bounding boxes 308-316), and bars of the bar chart (e.g., bounding boxes 318-336)

Returning to FIG. 2, after defining the bounding boxes and the chart elements, the region proposal manager 210 can send chart elements position data 214 to the query encoder 104. In one or more embodiments, the chart elements position data 214 includes, for each chart element in chart 200, information indicating the location of the chart element in chart 200, the text in the chart 200 associated with the chart element, and a chart elements identifier. As an example, for chart 300 in FIG. 3, the region proposal manager 210 identifies chart elements 302 and 303 as chart elements associated with the legend of the chart 300 and assigns chart elements identifiers "legend_label_0" to chart element 302 and "legend_label_1" to chart element 303. In one embodiment, a positioning scheme is based on where x-axis labels are assigned positions in increasing order from left-right, y-axis labels are assigned positions in increasing order from bottom to top, and legend labels are assigned positions left to right, and/or top to bottom. In one embodiment, for pie charts and donut charts, the positions are assigned in an anti-clockwise manner.

Figure 4:
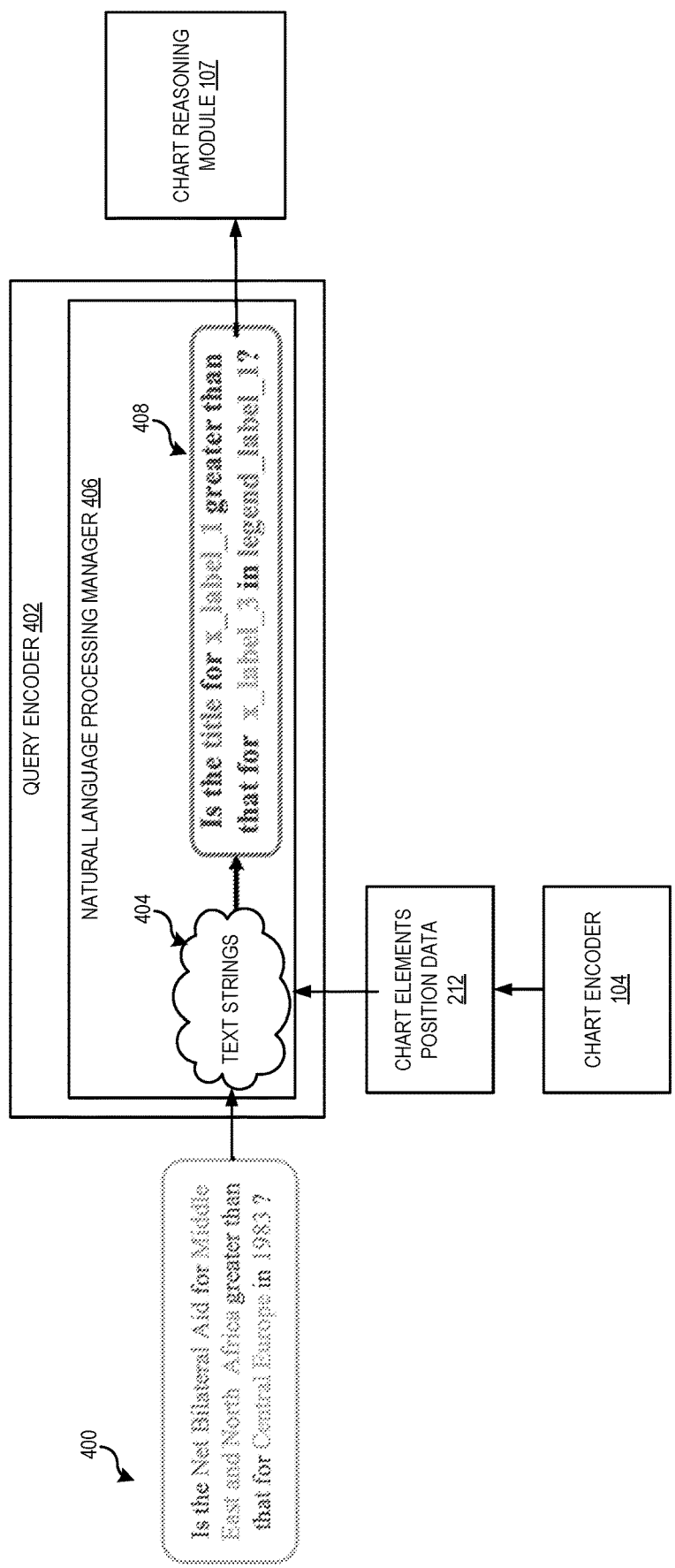
FIG. 4 illustrates a diagram of an example query encoder in accordance with one or more embodiments.

FIG. 4 illustrates a diagram of an example query encoder 404 in accordance with one or more embodiments. In FIG. 4, the query encoder 402 includes a natural language processing manager 406 configured to receive a query, identify textual elements (e.g., words) in the query, and generate a query embedding. In some embodiments, the query encoder 402 may include more or fewer modules than illustrated in FIG. 4. In one or more embodiments, the natural language processing manager 406 receives query 400. Continuing with the example chart 300 in FIG. 3, the query 400 is seeking the answer to the query, "Is the Net Bilateral Aid for Middle East and North Africa greater than that for Central Europe in 1983?" In one or more embodiments, the natural language processing manager 406 receives the query 400 as Text Strings 404. In one or more embodiments, the natural language processing manager 406 performs an optical character recognition (OCR) process on Text Strings 404 to recognize and/or extract text from an image or document file.

In one or more embodiments, as part of generating a query embedding, the query encoder 402 utilizes chart elements position data 214 from chart encoder 103. As described above, the chart elements position data 214 includes information indicating the location of chart elements (e.g., bounding boxes or representations thereof), the text in the chart associated with each chart elements, and chart elements identifiers. In such embodiments, the query encoder 402 correlates textual elements in the Text Strings 404 with the chart elements position data 214 to generate a query embedding 408. For example, the natural language processing manager 406 identifies identifiers for chart elements of the chart 300 and correlates the identifiers with one or more textual elements in the Text Strings 404. For example, the OCR process provides the natural language processing manager 406 access to the bounding boxes and content of different text areas on the chart. The natural language processing manager 406 can then use this information in conjunction with the role of the text area (e.g., using the received chart elements position data 214) to generate the query embedding 408. In the example of FIG. 4, "Net Bilateral Aid" is replaced with the chart element identifier (or token) "title," "Middle East and North Africa" is replaced with the chart element identifier "x_label_1," "Central Europe" is replaced with the chart element identifier "x_label_3," and "1983" is replaced with the chart element identifier "legend_label_1." After the natural language processing manager 406 generates the query embedding 408, the query embedding 408 is sent or passed to the chart reasoning module 107.

Figure 5:
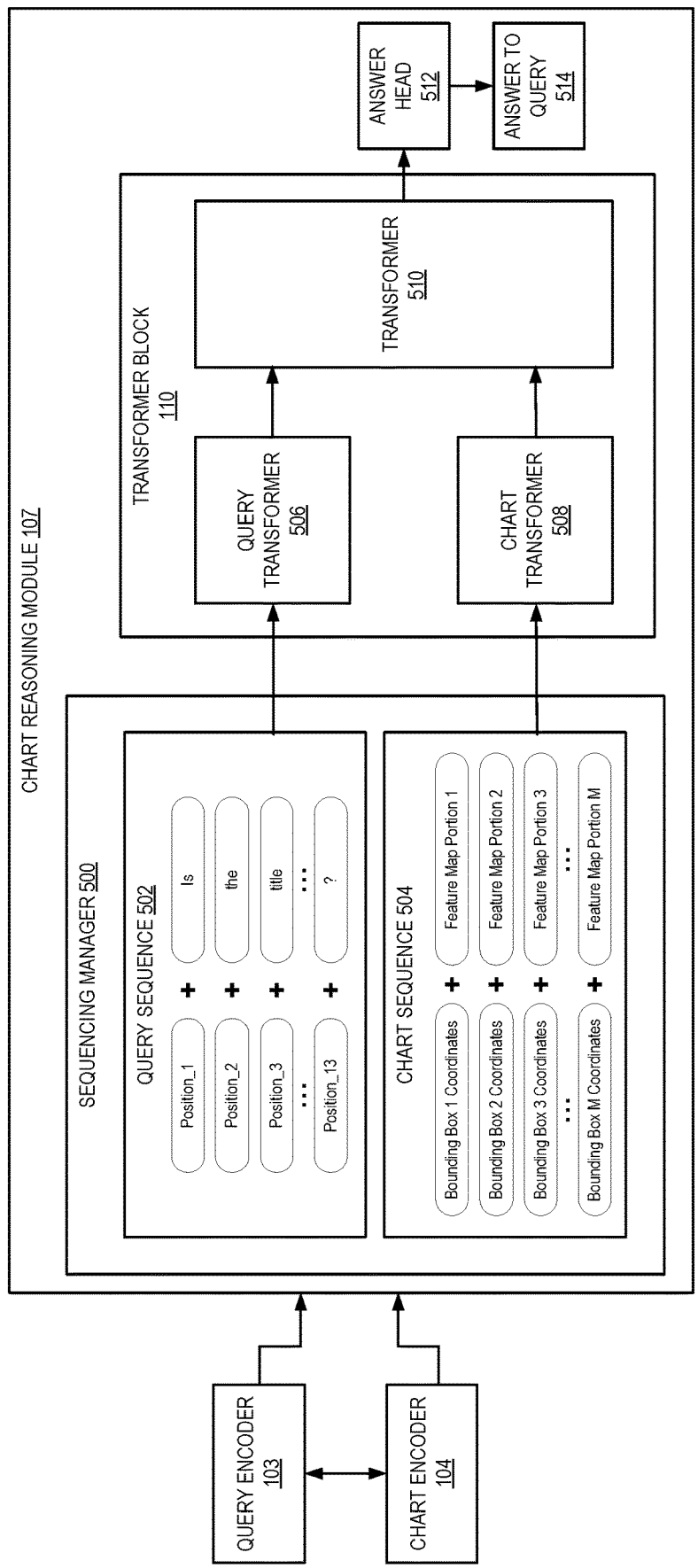
FIG. 5 illustrates a diagram of an example chart reasoning module in accordance with one or more embodiments.

FIG. 5 illustrates a diagram of an example chart reasoning module 107 in accordance with one or more embodiments. In one or more embodiments, the chart reasoning module 107 performs chart structure understanding, question understanding, and reasoning over the chart to find an answer to a query. In FIG. 5, the chart reasoning module 107 includes a sequencing network 500 and a transformer block 110. In one or more embodiments, the sequencing network 500 is configured to receive query embeddings and charts embeddings from query encoder 104 and chart encoder 104, respectively. In another embodiment, the sequencing network 500 retrieves or obtains the query embeddings and charts embeddings from a storage.

As illustrated in FIG. 5, the transformer block 110 is comprised of a series of transformers, including query transformer 506, chart transformer 508, and transformer 510. In one or more embodiments, each of the transformers can include three layers: a cross-attention layer, a self-attention layer, and a feed-forward layer. In one embodiment, the self-attention layer allows the transformer to look at each of the token (e.g., textual feature) in an input (e.g., query sequence) as it encodes a specific token. Each transformer can have an encoder-decoder architecture, where the encoder includes one or more encoder layers that process the input iteratively one layer after another, and the decoder includes one or more decoder layers that process the output from the encoder iteratively one layer after another. In one or more embodiments, the encoder layers process inputs to generated encodings that contain information indicating which parts of the inputs are relevant to each other, while the decoder layers do the opposite to generate an output sequence. In one or more embodiments, each encoder layer and decoder layer makes use of an attention mechanism. For each input, the attention mechanism weighs the relevance of every other input and draws information from them to produce the output.

Each of the transformers 506-510 in transformer block 110 is configured to receive an input sequence and to generate an output sequence. For example, the query transformer 506 performs question understanding, the chart transformer 508 performs chart structure understanding, and the transformer 510 performs reasoning over the chart to find an answer to a query. As illustrated in FIG. 5, the transformers in transformer block 110 are organized in a hierarchical structure where the outputs of the query transformer 506 and the chart transformer 508 are used as inputs to the transformer 510. In some embodiments, each of the query transformer 506, the chart transformer 508, and the transformer 510 represents one or more of a plurality of transformers.

In one or more embodiments, when the sequencing network 500 receives a query embedding from query encoder 104, the sequencing network 500 generates a query sequence. The sequencing network 500 can generate a query sequence by assigning a position number to each element of a received query embedding (e.g., word or chart element identifier). The query encoder 104 breaks the query embedding into a sequence of words $\{w_0, w_1, \ldots, w_n\}$ and encodes them into a query sequence $\{e_0, e_1, \ldots, e_n\}$ with their positions in the query:

$$e_i = \text{word-emb}(w_i) + \text{pos-emb}(i)$$

Continuing with the example chart 300 in FIG. 3 and query embedding 408 in FIG. 4, the sequencing network 500 generates query sequence 502. As illustrated in FIG. 5, query sequence 502 is composed of 13 position identifier-query embedding element pairs (e.g., "Position_1"+"Is"). In one or more embodiments, a normalization layer is applied before providing the query sequence 502 as an input to the transformer block 110.

In one or more embodiments, after generating the query sequence 502, the sequencing network 500 prepends or appends an additional "dummy" token to the query sequence 502. This additional token can be referred to as a classification token or [CLS] token.

Similarly, when the sequencing network 500 receives a visual embedding from chart encoder 103, the sequencing network 500 generates a chart sequence 504. The sequencing network 500 can generate a chart sequence by correlating the bounding box coordinates for a chart element (e.g., title, x-axis label, y-axis label, legend data, bar, pie piece, etc.) with a portion of a feature map (e.g., the feature map generated by the chart encoder 202 in FIG. 2). For example, the coordinates can be a set of x-coordinates and y-coordinates (e.g., corresponding to at least two points) defining the location of the bounding in the chart image. In one or more embodiments, the chart transformer 508 learns relationships between the chart elements in a chart sequence by taking into account each visual element in the chart sequence and its relationships to other visual elements in the chart sequence.

In one or more embodiments, because different charts can have different number of chart elements, the chart sequences are padded to have a fixed length of M for all charts. As illustrated in FIG. 5, chart sequence 504 is composed of M pairs.

In one embodiment, the chart sequence, $c_i$ is computed as below:

$$f_i = \text{LayerNorm}(W_F r_i + b_f)$$
$$p_i = \text{LayerNorm}(W_P x_i + b_p)$$
$$c_i = \frac{f_i + p_i}{2}$$

where, $r_i$ corresponds to the residual neural network features of $i^{th}$ chart element, $x_i$ refers to corresponding bounding box coordinates, and $(W_F, b_f)$ and $(W_P, b_p)$ are learnable parameters.

The query sequence 502 and the chart sequence 504 are then submitted as inputs to query transformer 506 and chart transformer 508, respectively. In one embodiment, query transformer 506 is a transformer with $N_L$ layers, each layer having a self-attention block and feed-forward block with residual connections to encode the meaning of the query. In one or more embodiments, the query transformer 506 encodes the meaning of the query by taking into account each word/token in the query sequence and its corresponding position within the query.

When a query sequence is passed through the query transformer 506, attention weights can be calculated between every token in the query sequence simultaneously. For example, the query transformer 506 can produce embeddings for every token in context that contain information not only about the token itself, but also a weighted combination of other relevant tokens weighted by the attention weights. Similarly, when the chart sequence is passed through the chart transformer 508, attention weights can be calculated between every token in the chart sequence simultaneously.

In one embodiment, chart transformer 508 is a transformer with $N_{CE}$ layers, each layer having a self-attention block and a feed-forward block both with residual connections. The chart transformer 508 learns relationships between chart elements, agnostic of the query. For example, as the outputs of the query transformer 506 and the chart transformer 508 is passed through the transformer 510, attention weights can be calculated between every token from the query sequence and the chart sequence simultaneously.

In one or more embodiments, the transformer 510 includes a cross-attention transformer block with $N_R$ layers which takes as input the contextual tokens generated by query transformer 506 and chart transformer 508. In some embodiments, each transformer (e.g., transformers 506-510) is a machine learning model that uses attention to improve training time. In one or more embodiments, each layer of transformer 510 comprises three blocks: cross-attention, self-attention, and feed-forward. In the cross-attention block for the output of the chart transformer 508, chart tokens act as query in the attention formulation and the query tokens act as keys and values, while the vice-versa happens in the cross-attention block for the output of the query transformer 506. The cross-attention block is followed by a self-attention block and a feed-forward block acting independently in their own streams. In one or more embodiments, all three blocks have residual connections. If the $i^{th}$ query token's features and $i^{th}$ chart element's features being used as input for $k^{th}$ layer are represented by $Q_{k-1}^{i}$ and $C_{k-1}^{j}$ and attention with q query, k keys, and v values is represented by attn(q, k, v), then cross attention block for query sequence can be represented as below:

$$Q_{k_{cross}}^{i} = \text{attn}(Q_{k-1}^{i}, C_{k-1}, C_{k-1}).$$

The self-attention block for query sequence can be represented as below:

$$Q_{k_{self}}^{i} = \text{attn}(Q_{k_{cross}}^{i}, Q_{k_{cross}}, Q_{k_{cross}})$$

where $$Q_k: \{Q_k^0, \ldots, Q_k^n\} \text{ and } C_k: \{C_k^0, \ldots, C_k^m\}.$$

For example, in response to processing the chart 300 in FIG. 3, the chart transformer 508 determines how bounding box 318 is related (e.g., belongs to the same data series) to other bounding boxes (e.g., the bars in bounding boxes 318-336 and the legend labels in bounding boxes 302-303). In this example, based on visual understanding, the chart transformer 508 determines that the bounding box 318 is part of a second data series of the chart 300 based its relationship with bounding box 303 in the legend (e.g., based on the pattern and/or color of the bar in bounding box 318 and the legend). Further, the chart transformer 508 can identify any other bounding boxes (e.g., bounding boxes 322, 326, 330, and 334) that are associated with the second data series (e.g., based on their pattern and/or color and the legend). When this information is then provided as input to transformer 510, the query elements and the graphical elements of the chart 300 can interact. For example, the identifier/token "legend_label_1" from query embedding 408 can interact with the bounding boxes determined to be associated with the second data series (and the "legend_label_1" graphical element) to determine whether the graphical element of (e.g., the bar) "x_label_1" is greater than the graphical element of (e.g., the bar) "x_label_3." In one or more embodiments, the transformer 510 outputs to an answer head 512. An answer to the query 514 can then be outputted from the answer head (e.g., to a requesting device or user). Based on the example chart from FIG. 3, the answer to the query 400 ("Is the Net Bilateral Aid for Middle East and North Africa greater than that for Central Europe in 1983") is "No."

Figure 6:
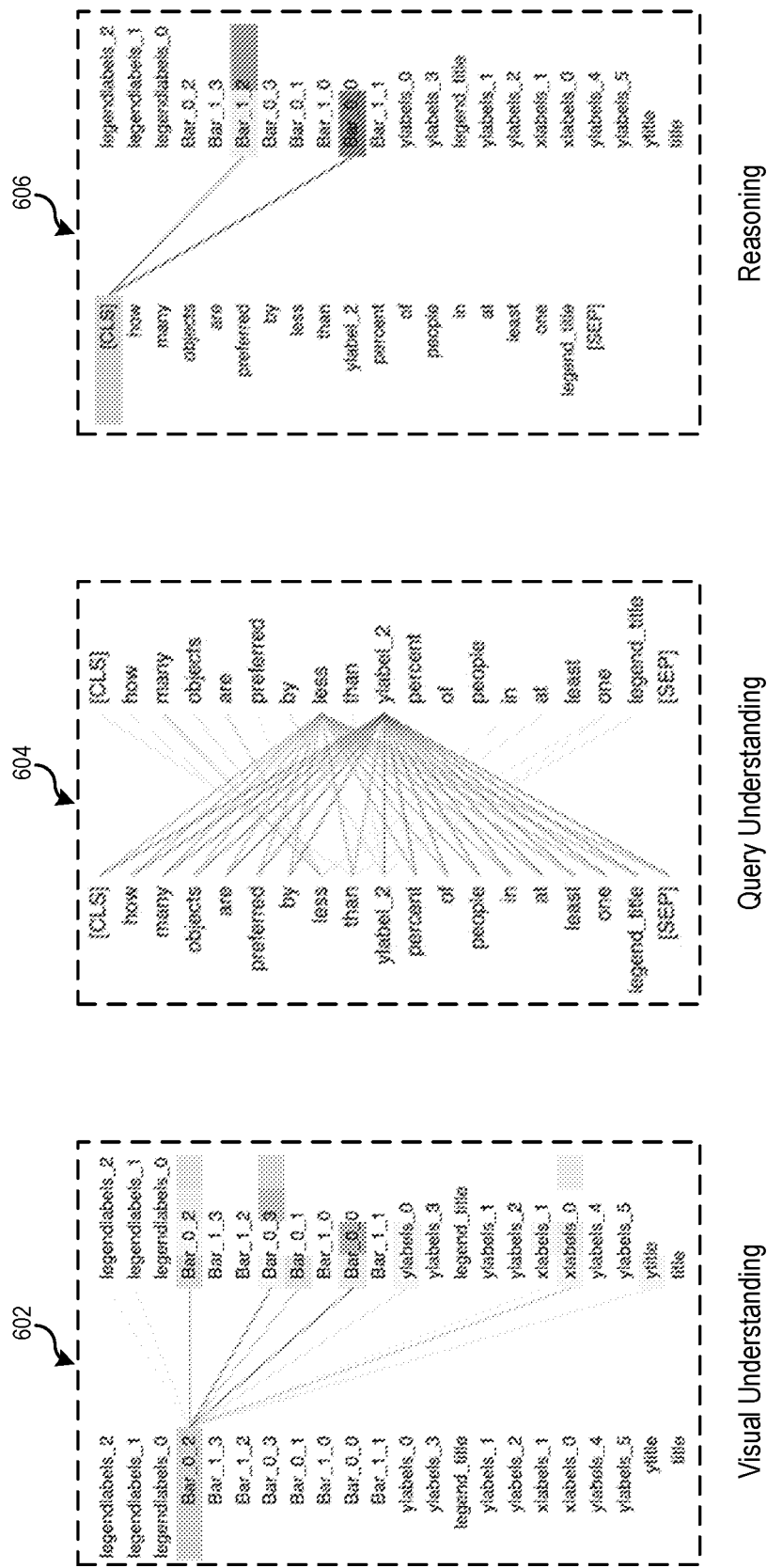
FIG. 6 illustrates example outputs of transformers in a transformer block in accordance with one or more embodiments.

FIG. 6 illustrates example outputs of transformers in a transformer block in accordance with one or more embodiments. Box 602 illustrates an example attention visualization output of a chart transformer.

In example in box 602, the attention visualization generated by the chart transformer shows that it is organizing the grouped bar chart into families on the basis of their group. "Bar_0_2" indicates a bar from group "xlabels_0" present at the $2^{nd}$ position from the left (for a vertical chart) and its attention is linked to the other bars in this same group, ("Bar_0_0", "Bar_0_1", "Bar_0_2", and "Bar_0_3", and the class of that group, "xlabels_0"), as indicated by the line segments. In another example, the attention visualization generated by the chart transformer could illustrate relationships between those bars which are from the same legend group (e.g., via a plurality of line segments between "legendlabels_1" and one or more bar identifiers).

Box 604 illustrates an example output of a query transformer for an example query embedding, "how many objects are preferred by less than ylabel_2 percent of people in at least one legend_title". A query sequence is provided as input to a query transformer for query understanding visualizations, resulting in the output displayed in box 604. The output in box 604 indicates a heavy focus on two parts of the query, contributing to a determination of the answer, e.g., "less" and "ylabel_2" with some focus on "how many," which indicates that this is a counting query/question.

In FIG. 6, the outputs of the visual understanding and the query understanding are provided as input to a third transformer for reasoning, resulting in the output displayed in box 606. The output in box 606 indicates a [CLS] token putting all of its attention in two bars, which satisfy the criteria of being "less than ylabel_2." This results in an answer to the query being to be "two," corresponding to the number of bars determined to satisfy the criteria.

In one or more embodiments, as part of the pre-training process for chart question answering, the chart question answering model is trained in the area of chart structure and language. Chart structure training includes tasks designed to induce the sense of different parameters which make up the properly defined structure of the chart, such as types of chart elements; position of chart elements; and/or color and pattern of non-textual elements in charts. For the type of chart elements, the pre-training considers a training data set including a plurality of chart categories and uses a cross-entropy classification loss for each element over them.

In one embodiment, for the position of chart elements, the pre-training can use a task similar to the one described above for generating chart embeddings. In one or more embodiments, since, even along the x-axis (or the y-axis in case of horizontal graphs), there can be multiple groups, a positioning scheme can be used for chart elements. For example, a stacked bar chart having a bar at a third position on the x-axis (left to right) and second position in legend box (top to bottom) is assigned a position 2_1 (zero-indexing). These positions can then be treated as targets for a classification task using a linear position head like that for types of charts elements.

In one embodiment, for the color and pattern of non-textual elements in charts, the pre-training can use chart metadata. For example, a particular color and pattern combination are treated as a category and the model is trained to identify the color and patterns as a classification problem.

In one embodiment, for the chart reasoning module, a pre-training task can include a sentence prediction task. For example, an original sentence is replaced with a mismatched sentence with a probability of 0.5, and a classifier is trained to identify the mismatched sentence.

Figure 7:
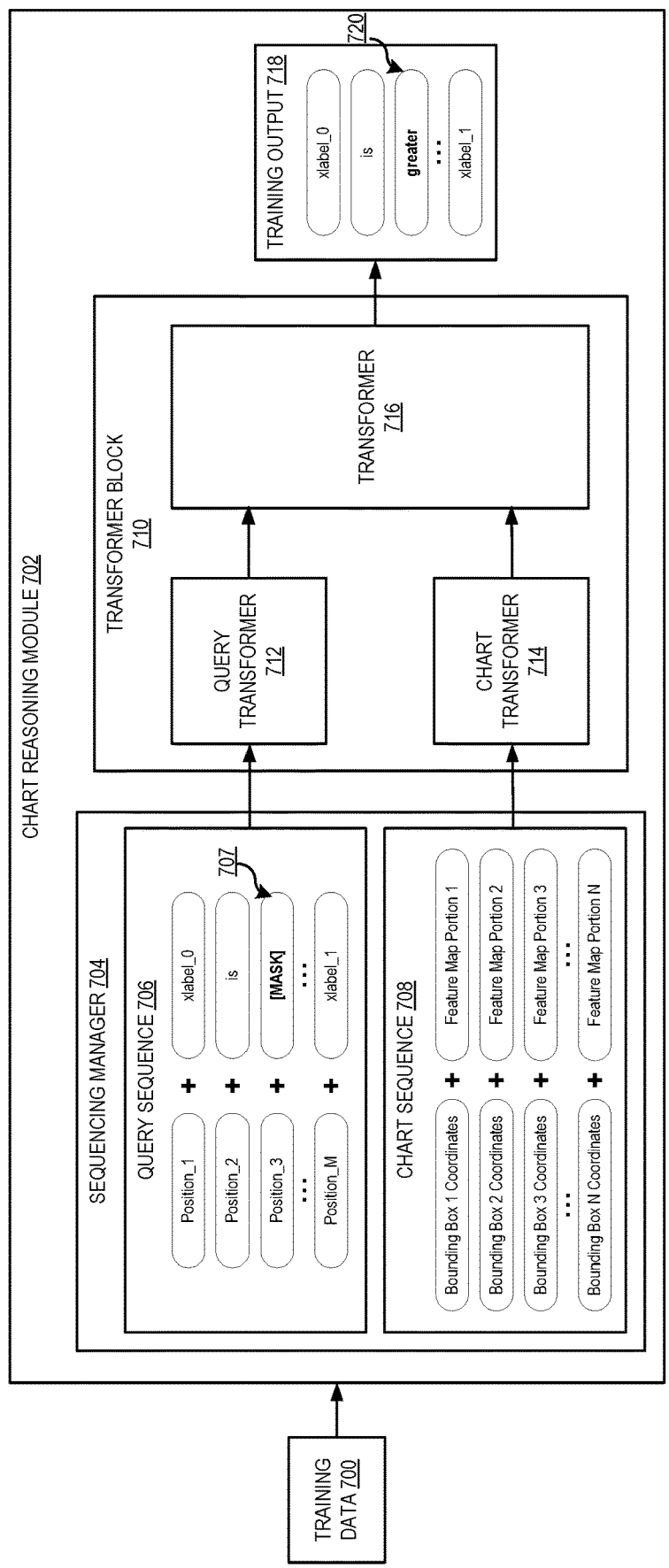
FIG. 7 illustrates a diagram of a pre-training of an example chart reasoning module in accordance with one or more embodiments.

FIG. 7 illustrates a diagram of a pre-training of an example chart reasoning module in accordance with one or more embodiments. For language tasks, the model can be trained on a Masked Language Modelling (MLM) task. In one example, meaningful words (e.g., chart vocabulary words) or words that affect the overall sentiment of the sentence (e.g., higher, lower, etc.) are masked, and a classifier is trained to identify the masked word.

In FIG. 7, the chart reasoning module 702 includes a sequencing network 704 and a transformer block 710. In one or more embodiments, the sequencing network 704 is configured to receive training data (e.g., training data 700). The training data 700 can include query embeddings and charts embeddings for pre-training the chart reasoning module 702. In one or more embodiments, the sequencing network 704 retrieves or obtains the training data 700 from a storage.

As illustrated in FIG. 7, the transformer block 710 is comprised of a series of transformers, including query transformer 712, chart transformer 714, and transformer 716. Each of the transformers 712-716 in transformer block 710 is configured to receive an input sequence and to generate an output sequence. For example, the query transformer 712 performs question understanding, the chart transformer 714 performs chart structure understanding, and the transformer 716 performs reasoning over the chart to find an answer to a query. As illustrated in FIG. 7, the transformers in transformer block 710 are organized in a hierarchical structure where the outputs of the query transformer 712 and the chart transformer 714 are used as inputs to the transformer 716. In some embodiments, each of the query transformer 712, the chart transformer 714, and the transformer 716 represents one or more of a plurality of transformers.

In one or more embodiments, when the sequencing network 704 receives a query embedding from the training data 700, the sequencing network 704 generates a query sequence (e.g., query sequence 706). The sequencing network 704 can generate a query sequence by assigning a position number to each element of a received query embedding (e.g., word or chart element identifier). As illustrated in FIG. 7, query sequence 706 is composed of M position identifier-query embedding element pairs (e.g., "Position_1+xlable_0", "Position_2+is", etc.). In one or more embodiments, a normalization layer is applied before providing the query sequence 706 as an input to the transformer block 710. The query sequence 706 also includes a partially masked position identifier-query embedding element pair, "Position_3+[MASK]" 707. In this example, a textual element from the query is masked, with the purpose of the pre-training process to determine or predict the masked element based on the understand and reasoning performed by the transformers in the transformer block 710.

When the sequencing network 704 receives a visual embedding from the training data 700, the sequencing network 704 generates a chart sequence (e.g., chart sequence 708). The sequencing network 704 can generate a chart sequence by correlating the bounding box coordinates for a chart element (e.g., title, x-axis label, y-axis label, legend data, bar, pie piece, etc.) with a portion of a feature map. As illustrated in FIG. 7, chart sequence 708 is comprised of N pairs.

The query sequence 706 and the chart sequence 708 are then submitted as inputs to the query transformer 712 and the chart transformer 714, respectively. The outputs of the query transformer 712 and the chart transformer 714 are then submitted as inputs to the transformer 716. The output of the transformer 716 is training output 718. As a result of the understanding and reasoning performed by the transformers in the transformer block 710, the training output 718 includes the determined or predicted textual element that was previously masked. For example, the unmasked textual element 720 is determined or predicted to be "greater," based on an understanding of, and the reasoning over, the provided query and chart received in the training data 700.

Figure 8:
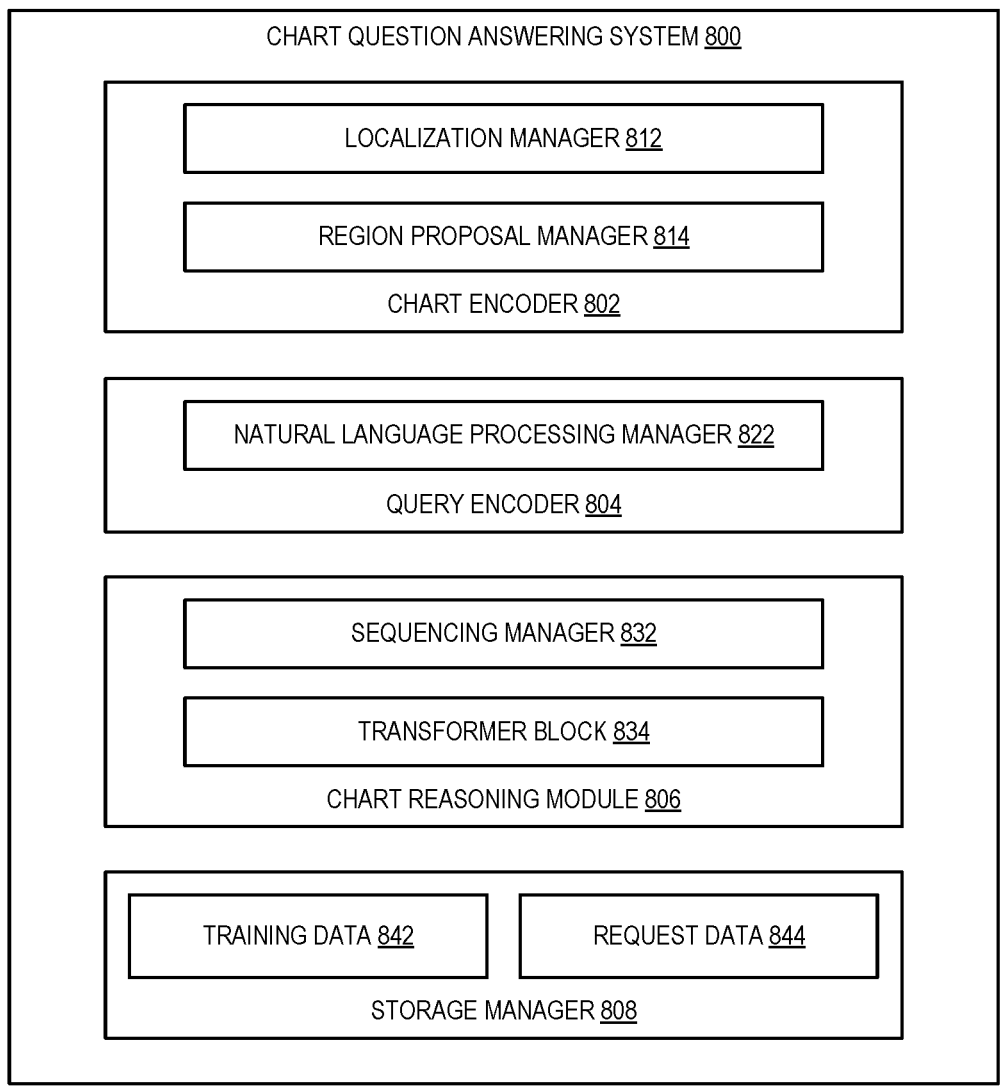
FIG. 8 illustrates a schematic diagram of chart question answering system in accordance with one or more embodiments.

FIG. 8 illustrates a schematic diagram of a chart question answering system (e.g., "chart question answering system" described above) in accordance with one or more embodiments. As shown, the chart question answering system 800 may include, but is not limited to, chart encoder 802, query encoder 804, chart reasoning module 806, and storage manager 808. The chart encoder 802 includes a localization system 812 and a region proposal manager 814. The query encoder 804 includes a natural language processing manager 822. The chart reasoning module 806 includes a sequencing network 832 and a transformer block 834. The storage manager 808 includes training data 842 and request data 844.

As illustrated in FIG. 8, the chart question answering system 800 includes a chart encoder 802. The chart encoder 802 can receive or retrieve a chart from a computing device or from a storage (e.g., storage manager 808). The chart can be processed by a localization system 812. In one or more embodiments, the localization system 812 is configured to detect or localize the chart elements of the received chart. For example, the localization system 812 can detect or localize the chart title, x-axis labels, y-axis labels, legend labels, and shapes and symbols (e.g., bars in a bar chart, piece pieces in a pie chart, line segments in a line chart, etc.). In some embodiments, the localization of chart elements in the chart may be learned. For example, the localization system 812 may include one or more neural network layers trained in object detection. In one example, the localization system 812 may include an object detection model trained to identify chart elements, such as a Mask-R CNN with a Resnet backbone, a residual neural network, to detect or localize the various chart elements in the received chart. The chart encoder 802 can further include a region proposal manager 814 configured to receive the localization information and feature maps from the localization system 812 and generate bounding boxes for the chart elements on the chart.

As further illustrated in FIG. 8, the chart question answering system 800 also includes a query encoder 804. The query encoder 804 can receive or retrieve a query associated with the received chart from a computing device or from a storage (e.g., storage manager 808). The query can be processed by a natural language processing manager 822 configured to receive a query, identify textual elements (e.g., words) in the query, and generate a query embedding. The query encoder 804 can also be configured to receive chart elements position data from the chart encoder 802. As described above, the chart elements position data can include information indicating the location of chart elements, the text in the chart associated with each chart elements, and chart elements identifiers.

As further illustrated in FIG. 8, the chart question answering system 800 also includes a chart reasoning module 806. The chart reasoning module 806 can include a sequencing network 832 and a transformer block 834. The sequencing network 832 can receive query embeddings and visual embeddings for charts received by the chart question answering system 800. As described above, the sequencing network 500 can generate a query sequence from a query embedding by assigning a position number to each element of a received query embedding (e.g., word or chart element identifier). Further, the sequencing network 832 can generate a chart sequence from a visual embedding by correlating the bounding box coordinates for a chart element (e.g., title, x-axis label, y-axis label, legend data, bar, pie piece, etc.) with a portion of a feature map The transformer block 834 can include a hierarchy of transformers. In one or more embodiments, the transformer block 834 includes a query transformer and a chart transformer that receive as inputs the query sequence and chart sequence, respectively. The chart transformer can determine relationships between the graphical elements in the graphical representation of data, and the query transformer can encode a meaning of the query. The outputs of the query transformer and the chart transformer are then used as inputs into another transformer to generate an output sequence. The output sequence from the transformer identifies an answer to the query in a context of the graphical representation of data.

As illustrated in FIG. 8, the chart question answering system 800 also includes the storage manager 808. The storage manager 808 maintains data for the chart question answering system 800. The storage manager 808 can maintain data of any type, size, or kind as necessary to perform the functions of the chart question answering system 800. The storage manager 808, as shown in FIG. 8, includes the training data 842. The training data 842 can include a plurality of charts and associated queries for training the chart reasoning module 806, as discussed in additional detail above.

As further illustrated in FIG. 8, the storage manager 808 also includes request data 844. For example, the request data 844 can include charts and associated queries received by the chart question answering system 800. The charts and queries can be temporarily stored in request data 844 in the storage manager 808 when received from a user computing device until retrieved or sent to the chart encoder 802 and query encoder 804 for processing.

Embodiments described above outperform existing Visual Question Answering (VQA) systems on familiar test and novel test subsets of a Data Visualizations via Question Answering (DVQA), as shown in Table 1, below.

TABLE 1

Experimental Performance Comparison

| Baselines | Test-Familiar | | | | Test-Novel | | | |
| --- | --- | --- | --- | --- | --- | --- | --- | --- |
| | Structure | Data | Reasoning | Overall | Structure | Data | Reasoning | Overall |
| QUES | 44.03 | 9.82 | 25.87 | 21.06 | 43.90 | 9.80 | 25.76 | 21.00 |
| IMG + QUES | 90.38 | 15.74 | 31.95 | 32.01 | 90.06 | 15.85 | 31.84 | 32.01 |
| SANDY | 96.47 | 65.40 | 44.03 | 56.48 | 96.42 | 65.55 | 44.09 | 56.62 |
| Plot-QA | — | — | — | 57.99 | — | — | — | 59.54 |
| LEAF-Net | 98.42 | 81.25 | 61.38 | 72.72 | 98.47 | 81.32 | 61.59 | 72.89 |
| Human | — | — | — | — | 96.19 | 88.70 | 85.83 | 88.18 |
| PReFIL | 99.77 | 95.80 | 95.86 | 96.37 | 99.78 | 96.07 | 95.99 | 96.53 |
| STL-CQA | 99.79 | 95.92 | 97.60 | 97.35 | 99.78 | 96.10 | 97.77 | 97.51 |

Embodiments have been compared to QUES, IMG+QUES, Stacked Attention Network with Dynamic Encoding (SANDY), Plot-QA, LEAF-Net, parallel recurrent fusion of image and language (PReFIL), and human baselines. As indicated in Table 1, embodiments significantly outperform existing VQA models, and human baselines.

Embodiments described above also outperform existing VQA systems on a familiar test subset (Table 2) and a novel test subset (Table 3) of a Locate, Encode & Attend for Figure Question Answering (LEAFQA++) dataset, as shown below.

TABLE 2

Experimental Performance Comparison

| Baselines | Structure | Data | Reasoning | Overall |
| --- | --- | --- | --- | --- |
| QUES (ENC) | 35.58 | 33.12 | 43.56 | 37.60 |
| HMG | 11.44 | 6.67 | 1.4 | 6.19 |
| LEAF-Net | 80.57 | 49.75 | 51.16 | 58.34 |
| STL-CQA (w/o pre-train) | 93.12 | 89.12 | 88.97 | 90.24 |
| STL-CQA (Pre-trained) | 94.28 | 91.38 | 91.32 | 92.22 |

TABLE 3

Experimental Performance Comparison

| Baselines | Structure | Data | Reasoning | Overall |
| --- | --- | --- | --- | --- |
| QUES (ENC) | 3.42 | 31.97 | 42.93 | 36.99 |
| IMG | 8.64 | 7.51 | 1.8 | 5.96 |
| LEAF-Net | 74.24 | 47.26 | 50.96 | 56.84 |
| STL-CQA (w/o pre-train) | 88.34 | 76.92 | 82.95 | 82.46 |
| STL-CQA (Pre-trained) | 89.96 | 78.67 | 85.82 | 84.54 |

Embodiments have been compared to QUES, IMG, and LEAF-NET. As indicated in Tables 2 and 3, embodiments significantly outperform existing VQA models. For example, embodiments show shows a significant improvement in accuracy over LEAF-Net with an overall increase of over 28%. The improvement is largest for data and reasoning questions, indicating that the VQA-based image attention network used in LEAF-Net does not generalize well for complex questions.

Each of the components 802-808 of the chart question answering system 800 and their corresponding elements (as shown in FIG. 8) may be in communication with one another using any suitable communication technologies. It will be recognized that although components 802-808 and their corresponding elements are shown to be separate in FIG. 8, any of components 802-808 and their corresponding elements may be combined into fewer components, such as into a single facility or module, divided into more components, or configured into different components as may serve a particular embodiment.

The components 802-808 and their corresponding elements can comprise software, hardware, or both. For example, the components 802-808 and their corresponding elements can comprise one or more instructions stored on a computer-readable storage medium and executable by processors of one or more computing devices. When executed by the one or more processors, the computer-executable instructions of the chart question answering system 800 can cause a client device and/or a server device to perform the methods described herein. Alternatively, the components 802-808 and their corresponding elements can comprise hardware, such as a special purpose processing device to perform a certain function or group of functions. Additionally, the components 802-808 and their corresponding elements can comprise a combination of computer-executable instructions and hardware.

Furthermore, the components 802-808 of the chart question answering system 800 may, for example, be implemented as one or more stand-alone applications, as one or more modules of an application, as one or more plug-ins, as one or more library functions or functions that may be called by other applications, and/or as a cloud-computing model. Thus, the components 802-808 of the chart question answering system 800 may be implemented as a stand-alone application, such as a desktop or mobile application. Furthermore, the components 802-808 of the chart question answering system 800 may be implemented as one or more web-based applications hosted on a remote server. Alternatively, or additionally, the components of the chart question answering system 800 may be implemented in a suit of mobile device applications or "apps." To illustrate, the components of the chart question answering system 800 may be implemented in a document processing application, including but not limited to ADOBE® Acrobat. "ADOBE®" is either a registered trademark or trademark of Adobe Inc. in the United States and/or other countries.

Figure 9:
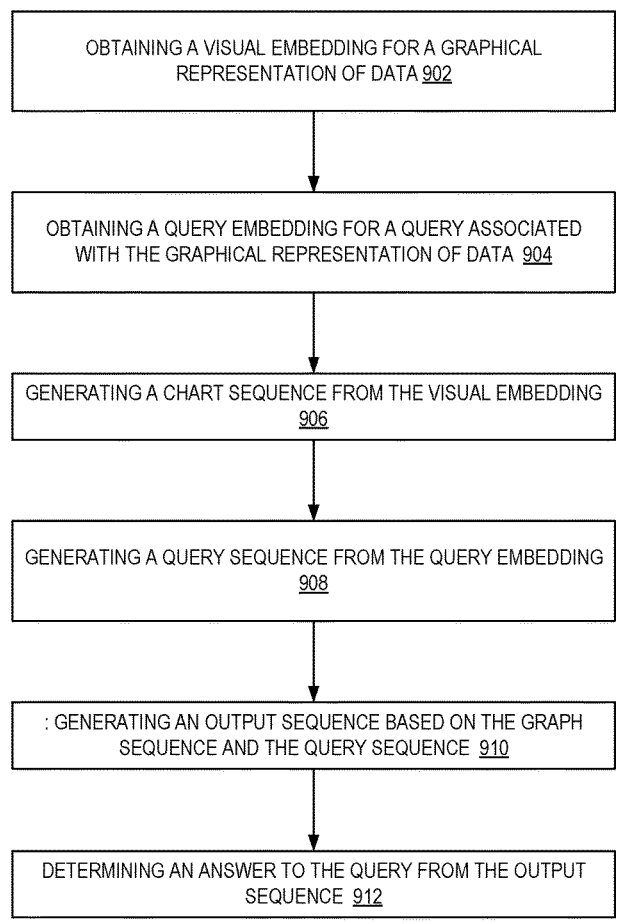
FIG. 9 illustrates a flowchart of a series of acts in a method of determining an answer to a query regarding a graphical representation of data in accordance with one or more embodiments.
Figure 10:
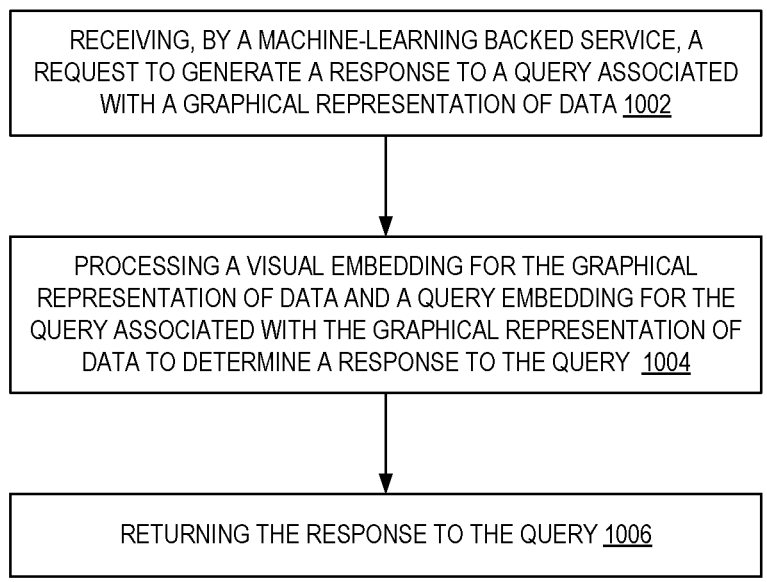
FIG. 10 illustrates a flowchart of a series of acts in a method of determining an answer to a query regarding a graphical representation of data in accordance with one or more embodiments.

FIGS. 1-8, the corresponding text, and the examples, provide a number of different systems and devices that allows a chart question answering system to determine or predict an answer to a query regarding a chart. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of determining an answer to a query regarding a graphical representation of data in accordance with one or more embodiments. In one or more embodiments, the method 900 is performed in a digital medium environment that includes the chart question answering system 800. The method 900 is intended to be illustrative of one or more methods in accordance with the present disclosure and is not intended to limit potential embodiments. Alternative embodiments can include additional, fewer, or different steps than those articulated in FIG. 9.

As shown in FIG. 9, the method 900 includes an act 902 of obtaining, by a sequencing network of a chart reasoning module of a chart question answering system, a visual embedding for a graphical representation of data (e.g., a chart). In one or more embodiments, the visual embedding represents a plurality of graphical (or chart) elements of the chart. Each graphical element may be associated position data (e.g., coordinates for a bounding box with the chart) and a feature map. In one or more embodiments, the sequencing network receives the visual embedding from a chart encoder. In other embodiments, the sequencing network obtains the visual embedding from a user via a user computing device or from a storage manager.

In another embodiment, the sequencing network generates the visual embedding by identifying the set of graphical elements of the graphical representation of data, identifying position data for each graphical element of the set of graphical elements within the graphical representation of data, and for each graphical element, correlating the position data for the graphical element with the portion of the feature map for the graphical element. In one or more embodiments, the set of graphical elements of the graphical representation of data is identified by an object detection model, such as a Mask-R CNN with a Resnet backbone.

As shown in FIG. 9, the method 900 also includes an act 904 of obtaining, by the sequencing network, a query embedding for a query associated with the graphical representation of data. In one or more embodiments, the query embedding represents a plurality of textual elements of the query (e.g., words). One or may textual elements of the query embedding may be substituted with an identifier for at least one graphical element of the set of graphical elements. In one or more embodiments, the sequencing network receives the query embedding from a query encoder. In other embodiments, the sequencing network obtains the query embedding from a user via a user computing device or from a storage manager.

In another embodiment, the sequencing network generates the query embedding by identifying the set of textual elements of the query, identifying one of more textual elements from the set of textual elements that correspond to the graphical element of the set of graphical elements, and for each textual element that corresponds to a graphical element, substituting the textual element with the identifier for the corresponding graphical element.

As shown in FIG. 9, the method 900 also includes an act 906 of generating, by a sequencing network, a chart sequence from the visual embedding. The chart sequence can include a plurality of tokens, where each token of the chart sequence including the position data and the feature map representative of one graphical element of the set of graphical elements As shown in FIG. 9, the method 900 also includes an act 908 of generating, by the sequencing network, a query sequence from the query embedding. The query sequence can include a plurality of tokens, where each token of the query sequence includes a textual element from the set of textual elements of the query and a corresponding position identifier indicating a position of the textual element in the query.

In one or more embodiments, the sequencing network appends a "dummy" token (e.g., a [CLS] or classifier token) to the query sequence that interacts with the textual elements of the query when processed through the query transformer.

As shown in FIG. 9, the method 900 also includes an act 910 of generating an output sequence based on the chart sequence and the query sequence. For example, the chart sequence can be applied to a chart transformer to determine relationships between the graphical elements in the graphical representation of data. Similarly, the query sequence can be applied to a query transformer to encode a meaning of the query. After being applied to the chart transformer and query transformer, the outputs of the chart transformer and the query transformer can be applied to another transformer to generate an output sequence. The output sequence from the transformer identifies an answer to the query in a context of the graphical representation of data. In one or more embodiments, the transformer receives the outputs of the chart transformer and the query transformer and generates weights between each element and all other elements in the chart sequence and query sequence.

As shown in FIG. 9, the method 900 also includes an act 912 of determining an answer to the query from the output sequence. When the "dummy" token interacts with the chart elements of the chart sequence, the "dummy" token will indicate an answer to the query in the context of the graphical representation of data. An answer head in the chart reasoning module can access or identify one or more answers associated with the "dummy" token appended to the query sequence and selects one of the one or more answers as the answer to the query. The dictionary of possible answers can include: an affirmative response ("yes"), a negative response ("no"), a numerical value (e.g., 1-10), and chart identifiers. In some situations, the output from the transformer block may include multiple answers. In one or more embodiments, the chart question answering system selects only one of the multiple answers. The answer to the query can then be provided to the requesting computing device or another computing device.

FIG. 10 illustrates a flowchart 1000 of a series of acts in a method of determining an answer to a query regarding a graphical representation of data in accordance with one or more embodiments. In one or more embodiments, the method 1000 is performed in a digital medium environment that includes the chart question answering system 800. The method 1000 is intended to be illustrative of one or more methods in accordance with the present disclosure and is not intended to limit potential embodiments. Alternative embodiments can include additional, fewer, or different steps than those articulated in FIG. 10.

As shown in FIG. 10, the method 1000 includes an act 1002 of receiving, by a machine-learning backed service, a request to generate a response to a query associated with a graphical representation of data. In some embodiments, the machine-learning backed service may be a web service, or other application, configured to receive requests over one or more networks (e.g., the Internet). For example, a machine-learning backed service may be a web service or other application that uses machine learning techniques to perform one or more requested actions. In some embodiments, the request may be received from an application executing on a client computing device, such as a document viewing and editing tool, web browser, or other application.

As shown in FIG. 10, the method 1000 also includes an act 1004 of processing, by the machine-learning backed service, a visual embedding for the graphical representation of data and a query embedding for the query associated with the graphical representation of data to determine a response to the query. The machine learning-backed service may use one or more machine learning techniques to process the visual embedding and the query embedding. For example, processing the visual embedding and the query embedding may include obtaining the visual embedding for a graphical representation of data and the query embedding for a query associated with the graphical representation of data.

In some embodiments, the method may further include an act of generating a chart sequence from the visual embedding and a query sequence from the query embedding. In some embodiments, the method may further include an act of generating an output sequence based on the chart sequence and the query sequence, for example, by applying the chart sequence to a chart transformer to determine relationships between the graphical elements in the graphical representation of data, apply the query sequence to a query transformer to encode a meaning of the query, and the outputs of the chart transformer and the query transformer to a third transformer to perform a reasoning over the graphical representation of data to find an answer to a query.

As shown in FIG. 10, the method 1000 also includes an act 1006 of returning, by the machine-learning backed service, the response to the query. In one or more embodiments, the machine-learning backed served sends the response to the query to a client computing device which originated the query, to be displayed on the client computing device or other computing device. I.

Figure 11:
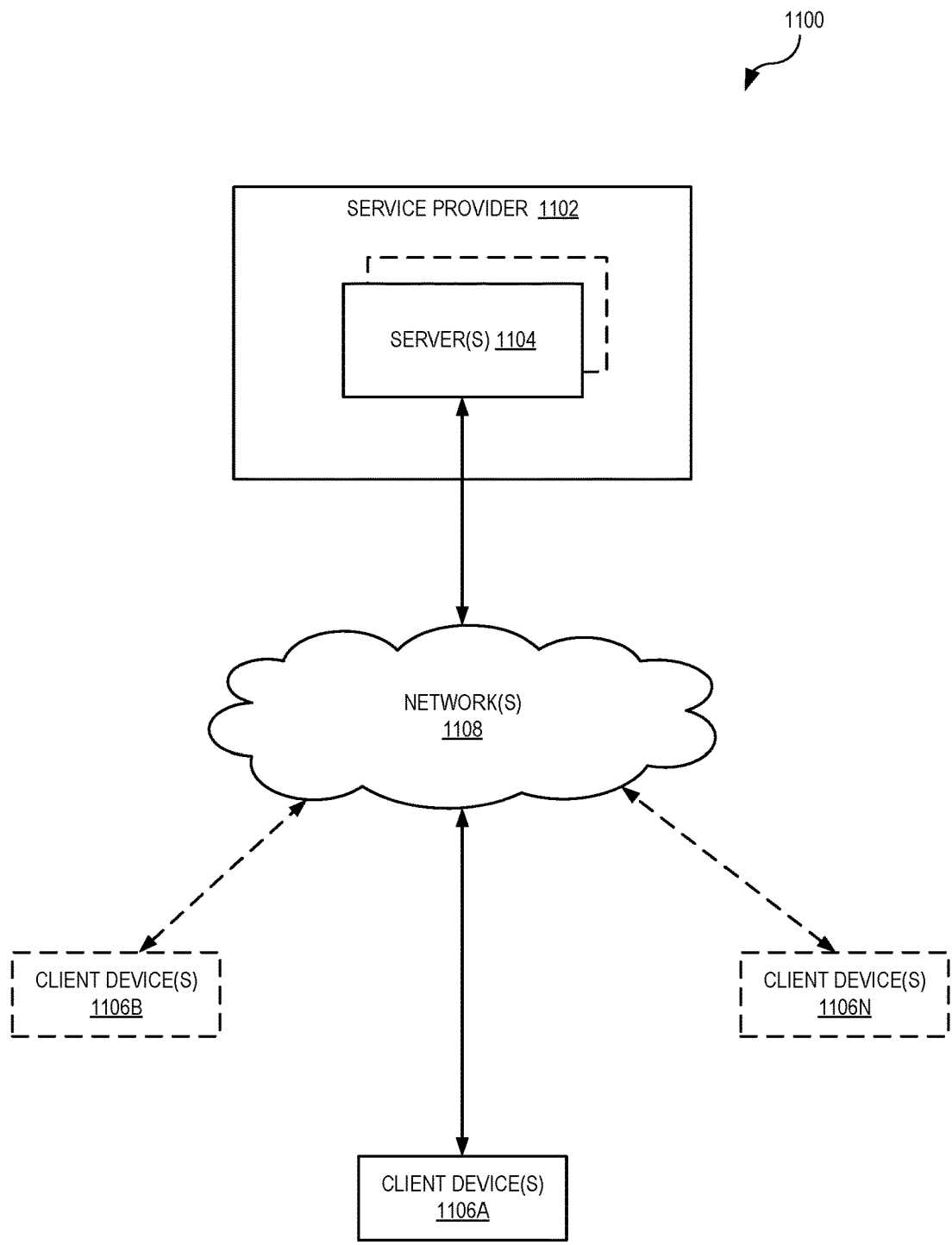
FIG. 11 illustrates a schematic diagram of an exemplary environment in which the image processing system can operate in accordance with one or more embodiments.

FIG. 11 illustrates a schematic diagram of an exemplary environment 1100 in which the chart question answering system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the chart question answering system 800. In particular, the chart question answering system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including training data 842, request data 844, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the chart question answering system 800. In particular, the chart question answering system 800 can comprise an application running on the one or more servers 1104 or a portion of the chart question answering system 800 can be downloaded from the one or more servers 1104. For example, the chart question answering system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide a user of the client device 1106A with an interface to provide a chart file or a document including a chart, or an interface to select a portion of a document including a chart. Moreover, the client device 1106A can receive a request (i.e., via user input) for an answer to a query associated with the chart and provide the request to the one or more servers 1104. Upon receiving the request, the one or more servers 1104 can automatically perform the methods and processes described above to determine an answer to the query associated with the chart. The one or more servers 1104 can provide an output including a determined answer to the query to the client device 1106A for display to the user.

As just described, the chart question answering system 800 may be implemented in whole, or in part, by the individual elements 1102-1108 of the environment 1100. It will be appreciated that although certain components of the chart question answering system 800 are described in the previous examples with regard to particular elements of the environment 1100, various alternative implementations are possible. For instance, in one or more embodiments, the chart question answering system 800 is implemented on any of the client devices 1106A-N. Similarly, in one or more embodiments, the chart question answering system 800 may be implemented on the one or more servers 1104. Moreover, different components and functions of the chart question answering system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
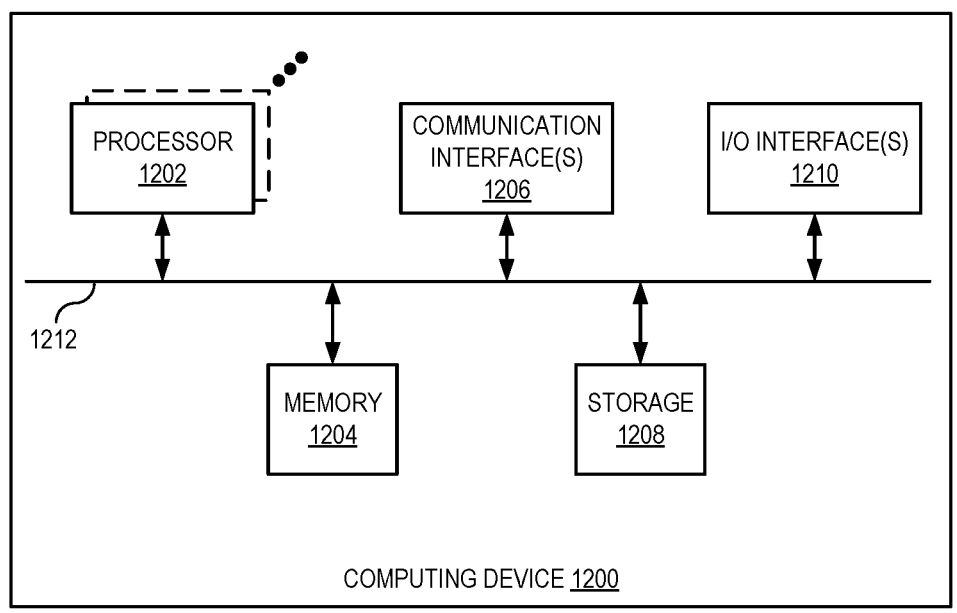
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   obtaining a visual embedding for a graphical representation of data, the visual embedding representing a plurality of graphical elements of the graphical representation of data, each graphical element associated with position data and a feature map;
   obtaining a query embedding for a query associated with the graphical representation of data, the query embedding representing a plurality of textual elements of the query with at least one textual element of the query substituted with an identifier for at least one graphical element of the plurality of graphical elements;
   generating a chart sequence from the visual embedding, each token of the chart sequence including the position data and the feature map representative of one graphical element of the plurality of graphical elements;
   generating a query sequence from the query embedding, each token of the query sequence including a textual element from the plurality of textual elements of the query and a corresponding position element indicating a position of the textual element in the query;
   generating an output sequence based on the chart sequence and the query sequence; and
   determining an answer to the query from the output sequence.

2. The computer-implemented method of claim 1, where generating an output sequence based on the chart sequence and the query sequence further comprises:
   applying the chart sequence to a first transformer to determine relationships between graphical elements in the plurality of graphical elements;
   applying the query sequence to a second transformer to encode a meaning of the query; and
   applying a first output of the first transformer and a second output of the second transformer to a third transformer to identify an answer to the query in a context of the graphical representation of data.

3. The computer-implemented method of claim 2, further comprising:
   appending a token to the query sequence, wherein after applying the first output of the first transformer and the second output of the second transformer to the third transformer, the token is associated with one or more answers to the query; and
   selecting one of the one or more answers to the query as the answer to the query.

4. The computer-implemented method of claim 2, wherein applying a first output of the first transformer and a second output of the second transformer to a third transformer to identify an answer to the query in a context of the graphical representation of data further comprises:
   generating weights between each element and all other elements in the chart sequence and query sequence.

5. The computer-implemented method of claim 1, wherein obtaining the visual embedding further comprises:
   generating the visual embedding for the graphical representation of data by:
      identifying the plurality of graphical elements of the graphical representation of data,
      identifying position data for each graphical element of the plurality of graphical elements within the graphical representation of data, and
      for each graphical element, correlating the position data for the graphical element with a portion of the feature map for the graphical element.

6. The computer-implemented method of claim 5, wherein identifying the plurality of graphical elements of the graphical representation of data further comprises:
   providing the graphical representation of data to a neural network that uses an object detection model trained to identify graphical elements.

7. The computer-implemented method of claim 1, wherein obtaining the query embedding further comprises:
   generating the query embedding by:
      identifying the plurality of textual elements of the query,
      identifying one of more textual elements from the plurality of textual elements that correspond to the graphical element of the plurality of graphical elements, and
      for each textual element that corresponds to a graphical element, substituting the textual element with the identifier for the corresponding graphical element.

8. The computer-implemented method of claim 1, further comprising:
   outputting the answer to the query.

9. A non-transitory computer-readable storage medium including instructions stored thereon which, when executed by at least one processor, cause the at least one processor to:
   obtain a visual embedding for a graphical representation of data, the visual embedding representing a plurality of graphical elements of the graphical representation of data, each graphical element associated with position data and a feature map;
   obtain a query embedding for a query associated with the graphical representation of data, the query embedding representing a plurality of textual elements of the query with at least one textual element of the query substituted with an identifier for at least one graphical element of the plurality of graphical elements;
   generate a chart sequence from the visual embedding, each token of the chart sequence including the position data and the feature map representative of one graphical element of the plurality of graphical elements;
generate a query sequence from the query embedding, each token of the query sequence including a textual element from the plurality of textual elements of the query and a corresponding position element indicating a position of the textual element in the query;
generate an output sequence based on the chart sequence and the query sequence; and
determine an answer to the query from the output sequence.

10. The non-transitory computer-readable storage medium of claim 9, where generating an output sequence based on the chart sequence and the query sequence further comprises:
applying the chart sequence to a first transformer to determine relationships between graphical elements in the plurality of graphical elements;
applying the query sequence to a second transformer to encode a meaning of the query; and
applying a first output of the first transformer and a second output of the second transformer to a third transformer to identify an answer to the query in a context of the graphical representation of data.

11. The non-transitory computer-readable storage medium of claim 10, further comprising:
appending a token to the query sequence, wherein after applying the first output of the first transformer and the second output of the second transformer to the third transformer, the token is associated with one or more answers to the query; and
selecting one of the one or more answers to the query as the answer to the query.

12. The non-transitory computer-readable storage medium of claim 10, wherein applying a first output of the first transformer and a second output of the second transformer to a third transformer to identify an answer to the query in a context of the graphical representation of data further comprises:
generating weights between each element and all other elements in the chart sequence and query sequence.

13. The non-transitory computer-readable storage medium of claim 9, wherein obtaining the visual embedding further comprises:
generating the visual embedding for the graphical representation of data by:
identifying the plurality of graphical elements of the graphical representation of data,
identifying position data for each graphical element of the plurality of graphical elements within the graphical representation of data, and
for each graphical element, correlating the position data for the graphical element with a portion of the feature map for the graphical element.

14. The non-transitory computer-readable storage medium of claim 13, wherein identifying the plurality of graphical elements of the graphical representation of data further comprises:
providing the graphical representation of data to a neural network that uses an object detection model trained to identify graphical elements.

15. The non-transitory computer-readable storage medium of claim 9, wherein obtaining the query embedding further comprises:
generating the query embedding by:
identifying the plurality of textual elements of the query,
identifying one of more textual elements from the plurality of textual elements that correspond to the graphical element of the plurality of graphical elements, and
for each textual element that corresponds to a graphical element, substituting the textual element with the identifier for the corresponding graphical element.

16. The non-transitory computer-readable storage medium of claim 9, further comprising:
outputting the answer to the query.

17. A computer-implemented method comprising:
receiving, by a machine-learning backed service, a request to generate a response to a query associated with a graphical representation of data;
processing a visual embedding for the graphical representation of data and a query embedding for the query associated with the graphical representation of data to determine a response to the query; and
returning the response to the query.

18. The computer-implemented method of claim 17, wherein processing a visual embedding for the graphical representation of data and a query embedding for the query associated with the graphical representation of data to determine a response to the query further comprises:
obtaining the visual embedding for the graphical representation of data, the visual embedding representing a plurality of graphical elements of the graphical representation of data, each graphical element associated with position data and a feature map;
obtaining the query embedding for a query associated with the graphical representation of data, the query embedding representing a plurality of textual elements of the query with at least one textual element of the query substituted with an identifier for at least one graphical element of the plurality of graphical elements;
generating a chart sequence from the visual embedding, each token of the chart sequence including the position data and the feature map representative of one graphical element of the plurality of graphical elements;
generating a query sequence from the query embedding, each token of the query sequence including a textual element from the plurality of textual elements of the query and a corresponding position element indicating a position of the textual element in the query;
generating an output sequence based on the chart sequence and the query sequence; and
determining an answer to the query from the output sequence.

19. The computer-implemented method of claim 18, where generating the output sequence based on the chart sequence and the query sequence further comprises:
applying the chart sequence to a first transformer to determine relationships between graphical elements in the plurality of graphical elements;
applying the query sequence to a second transformer to encode a meaning of the query; and
applying a first output of the first transformer and a second output of the second transformer to a third transformer to identify an answer to the query in a context of the graphical representation of data.

20. The computer-implemented method of claim 19, further comprising:
appending a token to the query sequence, wherein after applying the first output of the first transformer and the second output of the second transformer to the third transformer, the token is associated with one or more answers to the query; and selecting one of the one or more answers to the query as the answer to the query.

* * * * *